(12) United States Patent
Caminati et al.

(10) Patent No.: US 12,497,364 B2
(45) Date of Patent: Dec. 16, 2025

(54) COMPOUND FOR THE DETERMINATION OF THE PROTEIN FKBP12 AND A SENSOR UNIT COMPRISING IT

(71) Applicant: UNIVERSITA DEGLI STUDI DI FIRENZE, Florence (IT)

(72) Inventors: Gabriella Caminati, Sesto Fiorentino (IT); Piero Procacci, Sesto Fiorentino (IT); Stefano Menichetti, Sesto Fiorentino (IT); Maria Raffaella Martina, Sesto Fiorentino (IT); Laura Marsili, Sesto Fiorentino (IT)

(73) Assignee: UNIVERSITA DEGLI STUDI DI FIRENZE, Florence (IT)

( * ) Notice: Subject to any disclaimer, the term of this patent is extended or adjusted under 35 U.S.C. 154(b) by 776 days.

(21) Appl. No.: 17/757,597

(22) PCT Filed: Dec. 18, 2020

(86) PCT No.: PCT/IB2020/062214
§ 371 (c)(1),
(2) Date: Jun. 17, 2022

(87) PCT Pub. No.: WO2021/124269
PCT Pub. Date: Jun. 24, 2021

(65) Prior Publication Data
US 2023/0033380 A1    Feb. 2, 2023

(30) Foreign Application Priority Data

Dec. 20, 2019 (IT) .................. 102019000025066

(51) Int. Cl.
*C07D 211/06* (2006.01)
*B01L 3/00* (2006.01)
*C07D 211/60* (2006.01)
*G01N 33/553* (2006.01)
*G01N 33/573* (2006.01)

(52) U.S. Cl.
CPC .......... *C07D 211/06* (2013.01); *B01L 3/5027* (2013.01); *C07D 211/60* (2013.01); *G01N 33/553* (2013.01); *G01N 33/573* (2013.01); *G01N 2333/99* (2013.01)

(58) Field of Classification Search
CPC ... C07D 211/06; C07D 211/60; B01L 3/5027; G01N 33/553; G01N 33/573; G01N 2333/99; G01N 33/54353; G01N 33/54373; G01N 33/6896
See application file for complete search history.

(56) References Cited

U.S. PATENT DOCUMENTS 6,218,424 B1    4/2001    Hamilton et al.

OTHER PUBLICATIONS

Martina et al., "The Precise Chemical-Physical Nature of the Pharmacore in FK506 Binding Protein Inhibition: ElteX, a New Class of Nanomolar FKBP12 Ligands", J. Med Chem, 2013, vol. 56, No. 3, pp. 1041-1051.
Liu et al., "FK506-binding protein 12 ligands: a patent review", Expert Opinion on Therapeutic Patents, 2013, vol. 23, No. 11, pp. 1435-1449.
International Search Report and Written Opinion for Corresponding International Application No. PCT/IB2020/062214, 9 pages, Feb. 1, 2021.

*Primary Examiner* — Laura L Stockton
(74) *Attorney, Agent, or Firm* — LUCAS & MERCANTI, LLP (57) ABSTRACT

The present invention relates to novel compounds useful as sensors for the rapid and specific determination of the FKBP12 protein, a peptidyl-prolyl cis-trans isomerase (PPlase), the levels of which in the biological fluids of a subject change if the subject is affected by pathological conditions, in particular neurodegenerative diseases, such as the Parkinson's disease and the Alzheimer's syndrome, tumour pathologies, autoimmune diseases, or if that subject is in a phase of acute rejection after organ transplantation.

21 Claims, 4 Drawing Sheets

COMPOUND FOR THE DETERMINATION OF THE PROTEIN FKBP12 AND A SENSOR UNIT COMPRISING IT

CROSS-REFERENCE TO RELATED APPLICATIONS

This application is a 371 of PCT/IB2020/062214, filed Dec. 18, 2020, which claims the benefit of Italian Patent Application No. 102019000025066, filed Dec. 20, 2019.

FIELD OF THE INVENTION

The present invention generally relates to the field of medical diagnostics, and more precisely it refers to new compounds of formula (I) reported below, and to sensor units comprising them, suitable for determining sub-nanomolar concentrations of FKBP12 protein in samples of biological fluids, such as blood, urine, cerebrospinal fluid, sweat, mucus and saliva. They are useful for diagnostic and prognostic screening in neurodegenerative pathologies, such as Alzheimer's disease (hereinafter also referred to with the acronym "AD") and Parkinson's disease (hereinafter also referred to as "PD"), in tumours, in autoimmune diseases and in monitoring after transplantation.

BACKGROUND OF THE INVENTION

Parkinson's disease affects a huge fraction of the population over 60 in industrialized countries. Recent data estimate that about 800,000 people suffer from Parkinson's disease in Italy alone. These figures surpass 12 million in Europe, and 150 million in the world. Each year, approximately 60,000 Americans show symptoms that are attributable to Parkinson's disease, and this datum does not reflect the thousands of cases that go undetected due to a lack of widespread screening.

The figures are also very significant with regard to Alzheimer's syndrome. In 2017, nearly 50 million people worldwide were affected by dementia. This figure is expected to double every 20 years, reaching 131.5 million in 2050, mostly in developing countries. Already 58% of people with dementia live in low-middle-income countries, but by 2050 it will rise to 68%. More than 9.9 million new cases of dementia are diagnosed each year worldwide. Researches show that a large proportion of people currently living with dementia have not received a formal diagnosis. In high-income countries, about 50% of dementia cases are recognized and documented in primary care [1]. This "therapeutic gap" is certainly much greater in low- and middle-income countries. This suggests that, globally, about three-quarters of people with dementia have not received a diagnosis, and therefore do not access to the organized care and support that a formal diagnosis can provide. The World Alzheimer Report shows that early diagnosis and early intervention are important mechanisms thank to which the therapeutic gap can be reduced.

The development and commercialization of a simple and reliable screening test based on the early diagnosis of these neurodegenerations (hereinafter also referred to with the acronym "ND") would allow the definition of an adequate therapeutic programme, significantly increasing the chances of success in the treatment of the pathology.

The treatment of the patient affected by ND in the early stages of the onset of the disease, exploiting the early diagnosis thereof, not only guarantees a better quality of life, but also reduces the associated economic costs. The time between diagnosis and definition of the symptomatic treatment is crucial in the effort to find an effective cure. For example, in the case of PD, a recently published article [1] reports that in order to test promising therapies, patients with early PD must be identified as soon as possible with clinical tests, and they must be promptly sent to the centres where such clinical tests are conducted, before administering symptomatic drugs.

According to the World Health Organization, around 50,000 organ transplantations are performed each year in Europe and around 130,000 worldwide. The introduction of the therapy with immunosuppressive drugs that inhibit the activation of calcineurin in the immune response has greatly increased the survival after transplantations by reducing the risk of rejection. However, the use of these drugs can lead to an immunosuppressive condition with consequent increased susceptibility to infections. A reliable, rapid and easy-to-use diagnostic method through the measurement of FKBP12 levels is a decisive tool for an effective therapy modulation, limiting the risks due to both overdose and underdose of immunosuppressive drugs.

The importance of a sensor for FKBP12—a 12 kDa protein belonging to the immunophylline class containing the functional domain peptidyl prolyl isomerase (PPI) and also known as FK506 binding protein—lies in its long-established role in PD and AD syndromes. Convergent studies for at least two decades have shown that imbalances in the concentration of the endogenous FKBP12 protein are implicated in the onset of pathological amyloidosis in the early stages of the development of neurodegenerative diseases, before the symptoms of degeneration become evident [2]. FKBP12 regulates the localization and the transformation of the beta-amyloid peptide precursor protein in human cell lines and has been linked to numerous intracellular signalling processes through the interaction with various cellular components. An abnormal expression of FKBP12 was found in the post-mortem analysis of the brain of patients with neurodegenerative diseases [3] thus revealing the direct involvement of this protein in neurodegenerative pathogenesis.

There is a lot of clear evidence regarding the specific role of the FKBP12 protein in Parkinson's disease. Indeed, it has been repeatedly and consistently proven that FKBP12 significantly accelerates, in a dose-dependent manner, the aggregation of alpha-synuclein (α-SYN), both in vitro and in vivo [4]. This molecule is well known in the scientific literature as the one constituting the main protein component of Lewy bodies, that is, of the abnormal beta amyloid aggregates that develop inside nerve cells in Parkinson's disease and in other synucleopathies. It has long been known that in neurodegenerative diseases the levels of FKBP12 in the neurons facing the areas of the pathology are elevated [5]. More recently, Nilsson et al.[6] have found an increase in the levels of FKBP12 in the dorsal and medial part of the injured striatum in a rat model with Parkinson's disease. The presence of FKBP12 in the Lewy bodies was finally detected in a study published in Brain Reseach in 2018 [7] clearly demonstrating the direct involvement of this immunophylline in the pathogenesis of Parkinson's disease and at the same time suggesting the use thereof as a disease biomarker.

As regards the importance of FKBP12 monitoring in the post-operative course of patients who have undergone organ or tissue transplantation, it is important to note that the inhibition of the immunological response mediated by calcineurin in immunosuppressive treatments following organ transplantation occurs through the formation of a ternary complex consisting of the anti-rejection drug (typically FK506 or Sirolimus), of the FKBP12 protein and of a second protein (calcineurin or mTOR), which is thus deactivated. In this context, it has long been well known that FKBP12 levels in the plasma of individuals subjected an organ transplantation are strongly correlated with acute rejection events. In the publication [8], in plasma samples of rats subjected to intestinal transplantation with acute rejection phenomena, the FKBP12 levels (measured by means of sandwich-type immunoenzymatic assays, see below) were about four times higher than those recorded in rats treated with anti-rejection drugs. These studies show how the circulating FKB12 concentration is a fundamental parameter in the modulation of the immunosuppressive activity of therapies after transplantation and how the accurate and rapid monitoring thereof can promptly prevent acute anti-rejection phenomena.

In vitro and clinical studies suggest the use of FKBP as diagnostic, prognostic biomarkers, or for monitoring cancer therapy, as it has become increasingly clear that members of the FKBP protein family play an important role in tumour genesis and in the response to chemotherapy and radiotherapy, and that such members could also act as oncogenes or tumour suppressors depending on the type of tissue [9].

Finally, FKBP12 plays a primary role in autoimmune syndromes. It is well known [10] in fact that the plasma of patients suffering from various disabling autoimmune inflammatory diseases, such as systemic sclerosis, autoimmune hepatitis, and systemic lupus erythematosus, is characterized by a significant excess of anti-FKBP12 auto-antibodies.

Therefore, the determination of even extremely low concentrations of FKBP12 is crucial in many pathologies, and the analytical method for the detection thereof must provide a reliable result avoiding possibly costly and time-consuming methods.

Despite the overt role of FKBP12 in many pathologies with a very high social impact, surprisingly to date, there are no rapid and inexpensive methods of analysis to detect FKBP12 in traces for no type of disease in which this protein is involved. All studies performed for the detection of low concentrations of FKBP12, regardless of the disease, are a combination of generic methods for the determination of proteins such as hybridization in situ, Western blotting, two-dimensional gel electrophoresis, liquid chromatography with mass spectrometry (LC-MS), mass spectrometry for the characterization of animal brain tissues.

Recently, Magnani et al.[11] have developed a system for the measurement in traces of the ligand FK506 in blood samples, based on detections by atomic force microscopy (AFM) on mica surfaces functionalised with antibodies of the inhibitor FK506. The contact of the surface with a solution containing FK506 leads to the capture of the inhibitor by a portion of the adsorbed antibodies, proportional to the concentration of FK506 itself. Subsequently, the surface is contacted with a probe solution containing pre-assembled FKBP12-antiFKB12 complexes. The concentration of FK506 on the surface is finally detected by assessing, by means of AFM measurements, the height of the particles of FK506 bound to FKBP12-antiFKBP12 complexes. This technique, if it could, in principle, also be adapted to the measurement of the concentration of FKBP12, by reversing the roles of FK506 and FKBP12, in practice is very complex and expensive.

Previously [12], a method using the Quartz Crystal Microbalance (QCM)) functionalised with an alkyl-PEG mixed chain monolayer that exposed FKBP12 inhibitors (SAM-SLF), for the single-cycle selection of the FKBP12 protein by means of a T7 phage pool, was also described. In the validation of the SAM-SLF platform for the immobilization efficiency of FKBP12, the minimum detectable concentration of FKBP12 labelled with polystidine chain was in the order of a few nm/L.

[13] describes a fluorimetric method to selectively identify the FKBP12 protein by means of commercially available natural compounds, such as Tacrolimus (FK506) and Rifaximin (Rfx). The detection system used FK506 or Rfx receptors dispersed in biomimetic matrices consisting of Langmuir-Blodgett nanolayers of phospholipids, and not surfaces directly functionalised with the receptor via covalent bond. The presence of FKBP12 in the sample placed in contact with LB-FK506 or LB-Rfx was highlighted by measuring the fluorescence quenching of the tryptophan band as a result of the formation of FKBP12+LB/FK506 or FKBP12+LB/Rfx complexes. This system allowed only FKBP12 concentrations higher $1 \times 10^{-6}$M to be measured, therefore it was not useful in detecting smaller amounts of the protein.

Finally, there are disposable kits on the market, such as that of Biocompare®, for sandwich type immunoenzymatic assays (ELISA) specific for FKBP12 with variable cost, ranging between 200 and 900 Euro, nominally able to reveal traces of FKBP12 (subnanomolar). Such disposable kits typically consist of a plate with a variable number of wells whose surface is coated with a specific anti-FKBP12 (Ab) antibody. The concentration of FKBP12 is measured through multiple steps: the standard solutions and the samples to be analysed are deposited in the wells and allowed to react for a few hours; the solution is removed from the wells without washing; a solution of the Ab antibody functionalised with biotin is added to the wells, allowed to incubate for not less than one hour; the solution is removed from the wells and a multiple washing is carried out with a special wash buffer supplied in the kit. A solution of avidin functionalised with horseradish peroxidase is added to the wells and allowed to incubate for no less than one hour. The wells are emptied and cleaned again with the wash buffer. Finally, a solution of the chromogenic compound TMB is added to the wells and the concentration of FKBP12 immobilized on the surface as a sandwich complex (Ab-FKBP12-ab-Biotinil-Avidin-HRP-TMB) is revealed by colorimetry. A single ELISA test for FKBP12 can therefore take a full day of work. Consequently, such assays have so far been used sporadically in scientific research, but are not usable for diagnostic purposes.

The lack of availability of methods for the rapid and reliable analysis of FKBP12 is probably the reason that has prevented the use thereof as a biomarker in PD, AD or in autoimmune pathologies, in monitoring after transplantation, and in the monitoring of antitumour therapies.

In the publication of the American patent application No. US 2006115855, on the other hand, a different marker of neurodegenerative diseases has been described, but always belonging to the FKBP family, the 23 kDa FKBP7 protein containing the PP domain. The measurement of the concentration of FKBP7 in the serum was obtained by conventional Western-blot assays (2D-electrophoresis followed by quantitative staining). Based on Table 2 reported in this patent publication, patients affected by overt AD or PD were found to have a serum concentration of FKBP7 4 to 5 times lower than that recorded in healthy patients (average measured value equal to about 800 ppm).

To date, the best objective test for diagnosing neurodegenerative diseases such as PD and AD consists of a specialized brain scanning technique that analyses the dopaminergic system and the brain metabolism. In 2012, the American Food and Drugs Administration (FDA) approved a special type of brain scanning, DaT scan, to estimate the amount of dopaminergic nerve endings present after the injection of a dye. This examination, together with the neurological examination, allows a reliable diagnosis of an overt Parkinson's disease. Although very expensive and invasive, these tests still only serve to discriminate between Parkinson's and other "familial essential tremor" diseases, and they are not diagnostic tests also valid for AD and capable of diagnosing AD or PD in the early stages of the disease.

In conclusion, as far as neurodegenerative diseases are concerned, to date no effective diagnostic tests have been carried out on living patients, while as regards the FKBP12 protein it has only been detected post-mortem directly on sections of brain tissue of deceased patients, by mass spectrometry [3]. The diagnosis of these diseases is currently based on clinical information provided by the person already suffering from the compromising degeneration and/or on the results of expensive neurological examinations on the patient, which can only be performed in a limited number of specialised medical facilities.

Current analytical methods for the detection of FKBP12 are time-consuming and are generally performed using expensive instruments that are rarely to be found in common laboratories and testing centres.

Most methods require several steps, which involve the use of expensive biological reagents and, in some cases, synthetic efforts. Furthermore, as far as ELISA type tests are concerned, kits with an average cost of several hundred Euros can be used only once.

Methods based on the immuno-microscopy of the type Atomic Force Microscopy (AFM), such as the one described in [11] and mentioned above, require the use of expensive antibodies coupled with a complex AFM instrumentation that cannot be found in hospitals or analysis laboratories. Furthermore, the method is questionable and only detects concentrations up to the nanomolar.

Furthermore, the methods proposed for the detection of other members of the family of FKBP proteins, which in principle could also be applied to the detection of FKBP12, such as the one described in [12] mentioned above, do not have an adequate receptor nor exhibit dispersion of the receptor in an inert matrix, resulting in a probable loss of specificity.

The determination of FKBP12 in connection with neurodegenerative pathologies is even more problematic, the quantification of the FKBP12 protein in neurodegeneration is currently performed only on animal models or on deceased patients, while simple methods are not proposed for affected patients or candidates, thus preventing the possibility of performing clinical studies to assess an adequate therapeutic strategy.

SUMMARY OF THE INVENTION

Now the Applicant has developed a sensor unit useful for devices for the rapid and accurate detection in biological samples of the FKBP12 protein, a peptidyl-prolyl cis-trans (PPIase) which, as illustrated above, has a proven role in the neurodegenerative processes and in the immune response. The determination of FKBP12, even in traces, reveals many pathological conditions at an early stage, in particular of neurodegenerative diseases, such as the Alzheimer's disease and the Parkinson's syndrome, tumours and autoimmune diseases or disorders, and acute rejection after transplantation.

This sensor unit comprises as a receptor for the protein a novel compound of formula (I) reported below, assembled in a monolayer on at least part of the surface of a substrate, and optionally immersed in a matrix of inert molecules for the components of biological samples other than the FKBP12 protein subject of the measurement.

Advantageously, the present compound of formula (I) comprises a ligand group for the univocal recognition of the FKBP12 protein, an anchoring group for the covalent attack on the surface of a support to be inserted in the measurement device, and a spacing agent of such length and chemical characteristics as to ensure correct a density and molecular orientation of the receptor on the substrate surface.

The fact that the present receptor is able to detect down to subnanomolar concentrations of the FKBP12 protein with high accuracy is particularly advantageous. This allows both the quantification of the protein in systematic screening analyses of patients for an early diagnosis of neurodegenerative diseases, and the accurate monitoring of the protein in order to follow the post-operative course in organs and tissue transplantations.

It is therefore subject of the present invention a compound of formula (I) as defined in the first of the claims attached hereto.

A process of preparation of the aforementioned compound, a sensor unit comprising it in the form of a monolayer, a process for the preparation of the sensor unit, the measurement device comprising it, and the use of said device for the diagnosis of pathological conditions in a subject, to which a change is associated in the concentration of FKBP12 in biological samples previously taken from that subject with respect to the concentration of FKBP12 in a healthy subject, as defined in the subsequent independent claims attached hereto, represent a further subject of the present invention. Still a further subject of the present invention is the use of the aforementioned device for monitoring the post-operative course in a subject who has undergone an organ and/or tissue transplantation by determining the concentration of FKBP12 protein in a biological sample of said subject.

Other important characteristics of the compound of formula (I), of the sensor unit, of the device, of the preparation processes and of the uses of the device according to the invention are reported in the following detailed description, also with reference to the attached drawings, briefly illustrated below.

DETAILED DESCRIPTION OF THE INVENTION

Unless otherwise specified, in the context of the present invention the term "biological samples" means biological fluid samples such as cerebrospinal fluid, blood and blood derivatives, urine, sweat, mucus and saliva.

Subject of this invention are the novel compounds of formula (I)

(I)

wherein L is a group selected from thiol (—SH), organosulfur groups, such as sulfide (—SR), disulfide (—SSR), thiolesters (—SC(O)R), and dithiocarbammates (—SC(S)NRR') wherein R and R', equal or different to each other, are selected from alkyl or aryl residues, carboxylic acid, primary amine, trichlorosilane, triethoxysilane, trimethoxysilane, cholesterol, benzene, naphthalene, anthracene, phenanthrene, and pyrene, and Y is selected from linear chains $(CH_2)_n$— and —$(OCH_2CH_2)_m$— wherein n ranges between 7 and 13 and m ranges between 2 and 6.

In an aspect of this invention, in the compounds of formula (I), L is a group selected from thiol, sulfide, disulfide, carboxylic acid, primary amine, trichlorosilane, triethoxysilane, trimethoxysilane, cholesterol, benzene, naphthalene, anthracene, phenanthrene, and pyrene, and Y is selected from linear chains $(CH_2)_n$— and —$(OCH_2CH_2)_m$— wherein n ranges between 7 and 13 and m ranges between 2 and 6.

Figure 1:
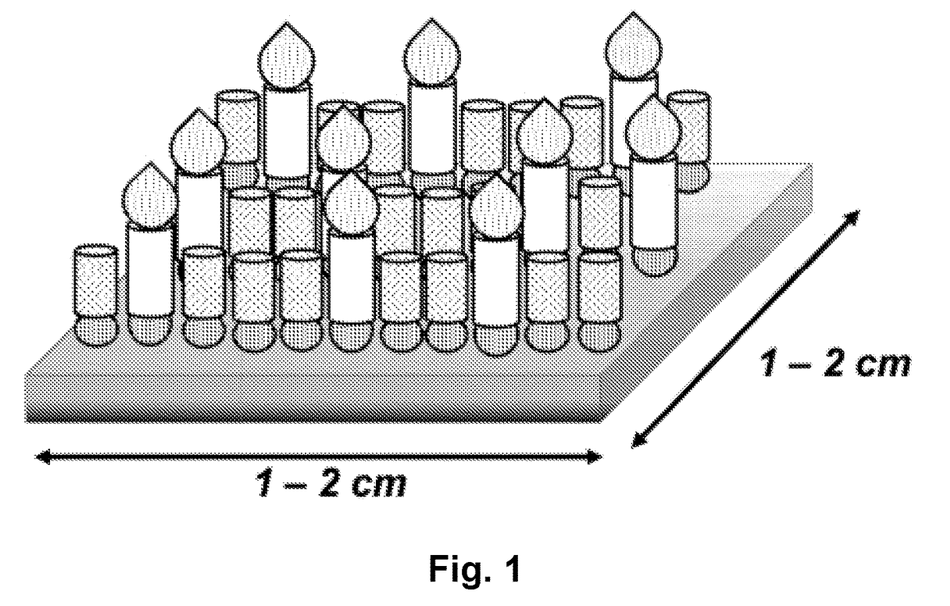
FIG. 1: schematic illustration (not to scale) of the sensor unit of the invention.
Figure 2:
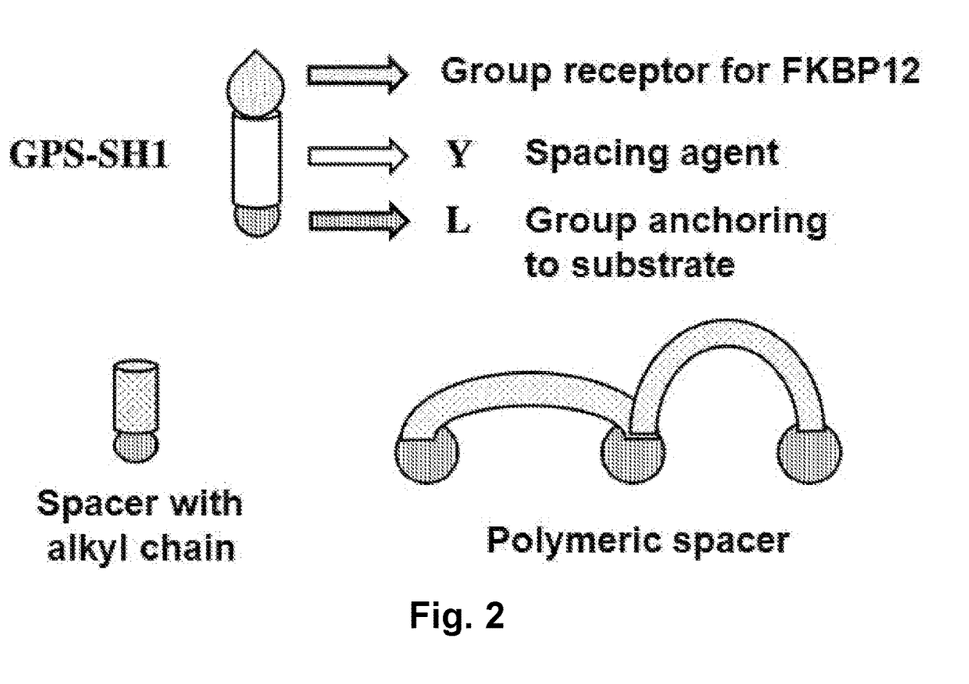
FIG. 2: schematic illustration of the molecular components that, assembled together, form the sensor unit of the present invention.

Such compounds comprise, as mentioned above, a ligand group for the univocal recognition of the FKBP12 protein consisting of the aromatic pendant, an anchoring group L for the covalent attack on the surface of a support of the measurement device which can vary according to the support to which it is supposed to be bound, and a spacing agent Y having length and chemical characteristics such as to ensure correct density and molecular orientation of the receptor on the substrate surface. FIGS. 1 and 2 attached hereto schematically illustrate the compounds of formula (I) of the invention.

Any technician skilled in the art can easily select from the L groups as defined above, the most suitable ones for the application of the specific sensor unit to be used on the substrate. For example, in the case of protein analytical measurement methods such as Surface Plasmon Resonance (SPR), Quartz Crystal Microbalance (QCM), instrumentation for electrochemical measurements, or Surface Enhanced Raman Spectroscopy, the substrate on which the sensor unit is built has a gold or silver surface. For example, in the case of the QCM method it consists of piezoelectric quartz crystals, which can be coated with gold, silver, ITO or silicon oxides or nitrides. On the other hand, in the case of different measurement methods, such as cantilevered stress measurements, the substrate forming the sensor element is a silicon oxide or nitride; in the case of spectrofluorimetric methods, the substrate is made of quartz or glass.

In the case of substrates coated with gold, the sensor unit of the invention comprises a receptor compound of general formula (I) wherein L is a group containing one or more sulfur atoms, in particular thiol, sulfide, disulphide, thiolesters or dithiocarbammates, for the attack to the surface of gold. For the chemical attack on quartz or silicon-based compounds, used in the other methods indicated above, the sensor unit of the invention typically comprises a receptor compound of general formula (I) wherein L is a silicon-containing group of formula $SiX_3$, wherein X is Cl, $OCH_2CH_3$, and $OCH_3$.

In the case of the analytical determination of the protein with methods such as the Surface Enhanced Raman Spectroscopy with substrates coated with metal nanoparticles, such as silver or gold, as such or veiled with graphene oxide or other graphene derivatives, the sensor element of the invention typically comprises a compound (I) wherein L is selected from primary amino groups (—$NH_2$) or carboxylic groups (—COOH) in the case of veiling with graphene derivatives.

As regards the spacer Y in the compounds of formula (I), the definition thereof takes into account the length and the characteristics that this part of the receptor molecule must have according to the invention to allow the binding of the protein even in traces on one side and on the other the complete and stable covering of the substrate by means of the group L. Optimal results in the experimentation conducted with the compounds of the invention were obtained for the compounds of general formula (I) wherein n is 8. Replica exchange molecular dynamics calculations for spacers with chains longer than n=13, showed a folding of the compound of formula (I), which prevents both exposure of the receptor group to the solution to be analysed and a compact coating of the substrate.

The compounds of formula (I) can be prepared starting from tert-butyl (S)-2-((3-phenylpropyl) carbamoyl)piperidine-1-carboxylate of formula (II) reported below by hydrolysis of the ester group followed by functionalisation with the aromatic residue bearing the appropriate spacer Y and ligand L.

The compounds of general formula (I) are used to create a sensor unit for the devices detecting the FKBP12 protein in biological samples, by coating at least a part of the measurement surface in the form of a monolayer of a compound of formula (I) as defined above, optionally immersed in a matrix of molecules of inert spacer towards proteins. This coating typically has a nanometric thickness, and consists of a homogeneous monolayer, in which the pipecolic unit for the recognition of the FKBP12 protein are extended towards the solvent. When the spacer is present, the coating comprises compound of formula (I) and spacer, having a thickness lower than the thickness created in the monolayer by the compound (I), as schematically illustrated in FIG. 1. As shown in FIG. 1, the nanostructured platform, constituting the sensor unit of the invention, is manufactured using the sequence illustrated in the figure: the platform architecture includes a solid substrate, on whose surface a molecular monolayer, of controlled thickness and composition on a nanometric scale, is assembled comprising molecules capable of recognizing and binding the FKBP12 protein, which are distributed in a matrix of inert or buffering molecules, both towards the FKBP12 protein and towards other interfering proteins present in the fluid to be analysed. The inert matrix is preferably present in the sensor unit of the invention, since it allows the receptor to be suitably distributed and avoids the non-specific interaction with proteins other than FKBP12, contained in the sample to be analysed, such as albumin, IgG, etc. The ratio of inert molecules of the matrix to receptor molecules for the FKBP12 protein can be modulated to optimize the surface density and the orientation of the receptor group and selected for an optimal sensor operation by any skilled technician by assessing the pair of inert molecules and receptors and the type of instrumentation chosen for detection, giving rise to different sensor units.

The element to be connected to the detection measurement system (transducer) can be used directly as a solid substrate; it can, for example, have a circular or rectangular shape and dimensions of a few centimetres. The modular design of this sensor unit mounted on the substrate will allow the adaptation thereof to a wide range of detection systems, such as QCM, SERS, SPR mechanical stress analysis, electrochemical or fluorescent systems, etc., as exemplified in the following Scheme 1:

Scheme 1

| Instrumentation | Substrate Description |
|---|---|
| QCM | In the case of microgravimetric detection systems the substrate can be a piezoelectric crystal cut at 5 or 10 MHz covered with an evaporated layer of gold or silver or silicon or silicon oxides or ITO. |
| SPR | In the case of detection systems based on Surface Plasmon Resonance, the gold surface can be coupled to a quartz prism by means of an elastomer. |
| SERS | In the case of investigation systems based on Surface Enhanced Raman Scattering, the surface to be covered can be in gold or quartz. The performance of the device can be increased by using nanostructured systems based on metallic nanoparticles also coupled to nanolayers of graphene derivatives |
| Stress analysis | For stress measurement sensors the substrate can be an array of cantilevers covered with gold or silver or silicon or silicon oxides/nitrides |
| Others | For other detection systems (fluorescence, electrochemical ones), glass, quartz, glassy carbon or ITO supports are preferably used. Such systems can also be used in conjunction with QCM determination. |

In other words, the present sensor unit for detection devices of the FKBP12 protein, consists of a compact monolayer of receptor molecules (compound of formula (I)), optionally immersed in a matrix of spacer molecules, with control of the surface density and of the thickness of the monolayer in the nanoscale. In the following, the receptor or receptor/spacer monolayer is also referred to as a Self-Assembled Monolayer (SAM). This monolayer, in which substrate and receptor are bound by the group L of the receptor compound (I), leaves the opposite part of the molecule with the aromatic and pipecolic pendants free for binding to the FKBP12 protein. Therefore the protein, if present in a sample of biological fluid such as cerebrospinal fluid, blood or saliva for example, put in contact with the monolayer, will bind quantitatively to the receptor of formula (I) forming the monolayer, which will allow not only qualitative but also quantitative measurements being able to obtain the concentration of protein in the sample.

The sensor unit of the invention for use as a sensor in detection devices of the FKBP12 protein in biological samples comprises, on at least a part of its measurement surface, a monolayer coating of a compound of formula (I) as described above, optionally immersed in a matrix of a spacer molecule of formula $CH_3$—Z—$CH_2$-L, wherein Z is equal to Y or is a group —$[OCH_2CH_2]_{n-1}$—$CH_2CH_2$-L with n ranging between 4 and 100, and Y and L are defined as above, or in a matrix of a phospholipid spacer molecule, selected for example from the group consisting of dipalmitoylphosphatidylcholine, dipalmitoylphosphatidylserine, dipalmitoyl phosphatidylethanolamine, dipalmitoylphosphatidic acid, dioleylphosphatidylcholine, and palmitoyloleylphosphatidylcholine.

In an embodiment of the invention, when L is a group selected from thiol, organo-sulfur groups, carboxylic acid, primary amine, trichlorosilane, triethoxysilane, and trimethoxysilane in the compounds of formula (I), the spacer has formula $CH_3$—Z—$CH_2$-L, as defined above.

In an embodiment of the invention, when L is a group selected from thiol, sulfide, disulfide, carboxylic acid, primary amine, trichlorosilane, triethoxysilane, and trimethoxysilane in the compounds of formula (I), the spacer has formula $CH_3$—Z—$CH_2$-L, as defined above.

In a further embodiment of the invention, when L is selected from cholesterol, benzene, naphthalene, anthracene, phenanthrene, and pyrene in the compounds of formula (I), the spacer is of the phospholipid type.

The process for the preparation of the receptor monolayer on the substrate which constitutes the sensor element of the invention comprises immersing at least part of the measurement surface of the element in a solution of the compound of formula (I) in a solvent selected from water and/or ethanol until the surface to be coated is saturated, followed by rinsing in the same solvent to remove any unreacted material from the measurement surface.

In a preferred embodiment of the present invention, the sensor element comprises a monolayer comprising a compound of general formula (I) as a receptor for the FKBP12 protein, immersed in a matrix of a spacer as defined above. Also the spacer, like the receptor (I), comprises a group L intended to bind to the substrate, therefore selectable according to the same criteria indicated above for the receptor. The spacer further comprises a group $CH_3$—$[CH_2]_n$—$CH_2$— or $CH_3$—$O[CH_2CH_2O]_mCH_2CH_2$— wherein n and m are defined as above, inert towards the specific adsorption of the FKBP12 protein and of the other components of the biological fluids under examination. When present, the spacer is used in a molar ratio with the receptor (I) ranging between about 4:1 and about 8:1, and preferably in a molar ratio of about 6:1 in the case of a linear alkyl chain matrix, which value ensures the maximum substrate coverage of the sensor element and the best response for the interaction with the protein to be detected FKBP12 by the receptor. As shown in the following experimental part, the spacer does not bind the FKBP12 protein, but promotes the selective binding thereof to the receptor.

Preferred spacers according to the invention are compounds of formula $CH_3$—$(CH_2)_n$-L, wherein n and L are defined as above, with linear chain or hydrophilic polymers with anti-fouling properties that hinder the non-specific adhesion of proteins or other components of the biological fluids on the surface of the nanosensor by increasing the selectivity thereof towards the FKBP12 protein.

With the sensor device of the invention it is possible to conduct a diagnostic method for the diagnosis of conditions to which a change is associated in the concentration of FKBP12 protein in biological samples previously taken from a subject under examination with respect to the detectable concentration for the same protein in a healthy subject.

With the present sensor device, a method for monitoring the post-operative course in subjects who have undergone organ and/or tissue transplantations can also be realised, comprising the detection of the FKBP12 protein in a biological sample previously taken from the subject under examination with the sensor device of the invention, and a step of assessing the data obtained so that in the absence of changes in the protein concentration the subject is having a regular post-operative course, while in the presence of changes in the concentration of the FKBP12 protein in the sample examined, the subject is having transplant rejection.

Changes in the concentration of the FKBP protein that are significant for diagnostic purposes of neurodegenerative conditions, tumour pathologies and autoimmune diseases or disorders, as well as for the purpose of monitoring the post-operative course in transplanted subjects, can also be very small, of the order of picomoles/L or nanomoles/L.

If the main advantage of the present invention is that of being able to effectively detect the presence of traces of the FKBP protein, at subnanomolar concentrations, several other advantages can be granted to the invention, including the flexibility of the receptor compounds of general formula (I), adaptable to different types of analytical techniques for protein detection having different types of measurement substrates: depending on the type of substrate, it will be sufficient to select a different group L in order to be able to obtain the best results of bond of the receptor to the substrate.

Furthermore, thanks also to the presence of the matrix of spacer that are inert to the components of the biological samples together with the receptor on the substrate, a particularly selective sensor element is obtained for the detection of the FKBP protein and inert to all the other components of the biological fluids under examination; this allows, among other things, to be able to carry out the measurements also directly on the biological samples previously taken from patients, possibly with minimal pretreatment interventions.

A further advantage of the present invention consists in the fact that the process for the preparation of the compounds (I) is a simple, inexpensive process, starting from commercially available reagents. Likewise, the process for the preparation of the self-assembled monolayer which forms the sensor element according to the invention is an extremely simple and fast process, which involves the use of only water and/or ethanol as solvents.

A still further advantage of the present invention is that of being able to carry out the detection of the FKBP12 protein with miniaturized detection systems and/or combined with microfluidic circuits, which allow to carry out the detection of the protein in a very short time and also having available only small amounts of sample to examine, as is the case with cerebrospinal fluid samples.

Last but not least, it should be noted that the experiments carried out by the inventors and described below have highlighted, as an advantage, a fair stability of the sensor element prepared with the compounds (I) over time, provided that it is kept in a container closed and saturated with $N_2$. For shorter times, the sensor element of the invention can also be stored in aqueous or buffered solution. Furthermore, it is not a disposable sensor, but it is a sensor element that can be "regenerated" after the first use, and used to perform multiple measurements, after reconditioning with imidazole or ethanol, while maintaining the accuracy of the detection of the protein unaltered.

Illustrative, but not limiting, examples of the present invention are reported below.

EXPERIMENTAL PART

Materials and Methods

FKBP12 expressed in *Escherichia coli*, molecular weight 11900, purity >95% was supplied by the Interuniversity Magnetic Resonance Consortium of Paramagnetic Metalloproteins, CIRMMP (Florence, Italy). The purity of FKBP12 was determined by SDS electrophoresis. $K_2HPO_4$ and $KH_2PO_4$ for the preparation of the phosphate buffer was obtained from Sigma-Aldrich (Italy). All measurements were made using ultrapure water (resistivity=18 MΩ cm, pH=5.6 at 20° C.) obtained with a Milli-RO equipment coupled with a Milli-Q set up (Millipore, Italy).

The concentration of the stock solutions of FKBP12 in PBS buffer (pH 7.4, 0.15 M NaCl) was checked by UV/Vis measurements using $\varepsilon_{280}$=9970 $M^{-1}$ $cm^{-1}$. The stock solution of FKBP12 was diluted to reach the concentrations used for the calibration straight line.

The formulae of the spacers used in mixture with the GPS-SH1 receptor to prepare the sensor unit of the present invention are reported below. These compounds were obtained from Sigma-Aldrich and used as they were received.

n-dodecyl mercaptan
($CH_3(CH_2)_{10}CH_2SH$) (C12-SH)

octadecyl mercaptan
($CH_3(CH_2)_{16}CH_2SH$) (C18-SH)
(reference spacer)

poly(ethylene glycol) methyl ether thiol
(PEG-SH) n between 40 and 50, molecular
weight average weight = 2000

1 mM solutions of receptor in ethanol were used for the formation of the monolayer, in the case of SAM films of receptor and spacer mixed solutions were prepared using various receptor-spacer molar ratios in the interval between 1:3 and 1:10.

Both the gold-coated and the silicon-coated crystals were cleaned with piranha solution, kept in contact with the crystals for about 10 seconds, then rinsed thoroughly with water and ethanol, and dried with compressed air or $N_2$.

The microgravimetric analyses were carried out with a Quartz-Crystal microbalance (QCM-Z 500 from KSV-Finland). This instrumentation is equipped with a Peltier element for controlling the temperature inside the measurement chamber. All experiments were performed at a temperature of T=20.0±0.1° C.

The cleaning of the instrument, of the measurement chamber, of the internal ducts, of the O-rings and of the syringe for injection of the substance was also carried out by means of repeated rinses with ultrapure water, followed by washing with ethanol. The chamber and the injection tubes of the solutions were then dried in a nitrogen flow.

The frequency and dissipation data for all recorded harmonics were processed with the QCMBrowse software which directly provides adsorbed mass in nanograms/cm$^2$, thickness of the monolayer in nanometers and viscoelastic parameters of the system.

The minimum free energy molecular configurations of the functionalised receptor were analysed under standard conditions by simulations of replicate exchange molecular dynamics for amplified sampling of the conformational states (using the orac5.3 program together with the amber99sb force field for molecular mechanics), verifying the maintenance of the optimal exposure in aqueous solution of the carbonyl substituents on the piperidine unit for FKBP12 recognition as a function of the length and chemical characteristics of the spacing agent.

Example 1

Synthesis of the Functionalised Receptor of Formula (I) Wherein Y is (CH$_2$)$_8$ and L is SH (I)

Step 1: Preparation of tert-butyl (S)-2-((3-phenylpropyl)carbamoyl)piperidine-1-carboxylate of Formula (II)

(II)

N-Boc-L-pipecolinic acid (425 mg, 1.88 mmol), DIPEA (775 mg, 6 mmol) and HATU (684 mg, 1.8 mmol) were added to a solution of 3-phenylpropyl-1-amine (162 mg, 1.2 mmol) in 10 ml of anhydrous DMF. The additions are carried out at a constant temperature of 0° C., keeping the reaction flask under constant stirring in N$_2$ atmosphere. When all the reagents had dissolved and the solution in the reaction flask was homogeneous, the temperature was allowed to rise to room temperature and maintained for 15 hours.

The reaction solution was then mixed with 30 mL of ethyl acetate, and the phases were allowed to separate; the organic phase was washed several times with a saturated solution of NH$_4$Cl and brine and dried on anhydrous Na$_2$SO$_4$. The aqueous solution was then filtered and evaporated by rotary evaporator until a yellow oil was obtained which was purified by flash chromatography column on silica gel using a mixture of DCM:EtOAc/8:1 as eluent. The expected derivative of the title was isolated as a colourless oil (330 mg, 80% yield) and characterized as previously described.

Step 2: Preparation of 4-hydroxyphenylglyoxalic acid of Formula (III)

(III)

Freshly distilled thionyl chloride (1.67 mL) was added dropwise at room temperature to a suspension of D-4-hydroxyphenylglycine (1,050 mg, 6.2 mmol) in methanol (25 mL). The reaction solution was left under stirring for 15 hours, then the solvent was removed by means of a rotary evaporator to obtain the methyl ester of the D-4-hydroxyphenylglycine in the form of a white solid, in quantitative yield. It was used for the subsequent steps without further purification.

The methyl ester of D-4-hydroxyphenylglycine (650 mg, 3.00 mmol) prepared as described above, then glyoxylic acid (2200 mg, 30 mmol) and copper (II) sulfate pentahydrate (740 mg, 3.00 mmol) were added in a freshly prepared buffer solution with 2.5 moles of pyridine and 0.5 moles of acetic acid in 38 mL of water. The reaction mixture was kept under stirring for 10 hours at room temperature, then extracted three times with portions of dichloromethane (20 mL). The organic phases were then combined, washed three times with 1 N HCl and dried over anhydrous Na$_2$SO$_4$. The organic phase was then concentrated in the rotary evaporator until a raw product was obtained, purified on a chromatographic column with eluent (CHCl$_3$). Methyl-4-hydroxyphenylglyoxylate (300 mg, 40% yield) was thus obtained in the form of a yellow solid, used without further purification as follows.

The methyl-4-hydroxyglyoxylate (410 mg, 2.3 mmol) was dissolved in a 2.5 M NaOH solution (20 mL) and the reaction mixture was kept under stirring for 2 hours at room temperature. The reaction mixture was then washed with diethyl ether (2×10 mL) and acidified with concentrated HCl up to pH=2. The aqueous solution was then extracted with ethyl acetate (5×10 mL) and the combined organic phases, washed with brine (2×10 mL) and dried over anhydrous Na₂SO₄. After filtration, the removal of the solvent with the rotary evaporator delivered the 4-hydroxyphenylglyoxalic acid of formula (III) of the title in the form of a yellow solid (310 mg, 83% yield), characterized by comparison with an authentic sample.

Step 3: Preparation of (S)-1-(2-(4-hydroxyphenyl)-2-oxoacetyl)-N-(3-phenylpropyl)piperidine-2-carboxamide of Formula (IV)

(IV)

4-hydroxyphenylglyoxalic acid (148 mg, 0.88 mmoles) prepared as above, DIPEA (460 mg, 3.06 mmol) and HATU (410 mg, 1.08 mmol) were added to a solution of (2S)—N-(3-phenylpropyl)piperidine-2-carboxamide (177 mg, 0.72 mmol) in anhydrous DMF (30 mL), keeping the reaction mixture at a constant temperature of 0° C. in N₂ atmosphere. The reaction mixture has assumed a yellow colour and is kept under stirring at room temperature for 48 hours, maintaining the N₂ atmosphere. The reaction mixture was then diluted with ethyl acetate (in 30 mL) and the phases were allowed to separate; the organic phase was washed with a saturated NH₄Cl solution and brine (3×25 mL), and dried over anhydrous Na₂SO₄. The solution was filtered and evaporated with a rotary evaporator until a yellow oil was obtained. The raw thus obtained was purified on chromatographic column with eluent DCM:EtOAc/8:2 so as to obtain (S)-1-(2-(4-hydroxyphenyl)-2-oxoacetyl)-N-(3-phenylpropyl)piperidine-2-carboxamide (190 mg, yield 67%) of the title of formula (IV), in the form of a white solid. NMR, IR and mass spectroscopic analyses provided the following data:

$^1$H NMR, 400 MHz, CDCl₃, δ:1.25-1.88 (m, 8H, CH₂-16+CH₂-8+CH₂-18+CH₂— 18*); 2.22-2.30 (m, 2H, CH₂-17); 2.62-2.66 (m, 2H, CH₂-7); 2.68-2.76 (m, 2H, CH2-7*); 3.25-3.36 (m, 4H, CH₂-9, H-15, H-9*); 3.47-3.50 (m, 1H, H-15); 4.13-4.14 (m, 1H, H-13*); 4.59-4.63 (m, 1H, H-15*); 5.18 (m, 1H, H-13); 6.33 (bs, 1H, NH-10); 6.83-6.85 (d, J=8 Hz, 1H$_{arom}$); 6.87-6.90 (d, J=12 Hz, 1H$_{arom}$); 6.92-6.94 (m, 1H$_{arom}$); 7.15 (s, 1H, OH$_{para}$); 7.17-7.19 (m, J=8 Hz, 2H$_{meta}$); 7.24-7.29 (m, 1H$_{arom}$); 7.80-7.82 (d, J=8 Hz, 2H H$_{orto}$). The spectrum $^1$H-NMR showed the presence of a 1:0.7 mixture of two rotamers. For the signals where the attribution to the different rotamers has been possible, the symbol (*) refers to the minority rotamer.

$^{13}$C NMR, 100 MHz, CDCl₃, δ:20.21; 20.22; 24.8; 26.29; 26.31; 30.90; 30.01; 30.06; 39.56; 44.61; 51.96; 57.06 (C-13); 116.28; 116.34; 125.95; 125.98; 128.12; 128.60; 128.25; 128.29; 128.38; 128.42; 132.41; 132.66; 140.99; 141.07; 168.37 (2C, amide C=O-19, C-26); 170.46 (amide C=O-11); 190.58 (ketone C=O).

ESI-MS: m/z 417.25 [M+Na]⁺, 811 [2M+Na]⁺ (positive mode); 787 [2M-H]⁻ (negative mode).

IR (CDCl₃), cm⁻¹:3578 (w, NH stretch.), 3315 (w, NH stretch.), 3028 (w, CH stretch.), 2947 (CH stretch.), 1664 (N—C=O stretch.), 1601 (Ph-C=O stretch).

$[\alpha]^{25}_D$=−7.68°, (c=40 mg in 2 mL DCM).

Step 4: Preparation of (S)-4-(2-oxo-2-(2-((3-phenylpropyl)carbamoyl)piperidin-1-yl)acetyl)phenyl 11-(tritylthio)undecanoate (V)

11-(tritylthio)undecanoic acid (56 mg, 0.12 mmol) is added at room temperature to a solution of (S)-4-(2-oxo-2-(2-(3-phenylpropylcarbamoyl)piperidin-1-yl)acetyl)phenyl acetate (100 mg, 0.25 mmol) in anhydrous DMF (20 mL). The reaction mixture was then brought to 0° C. and DIC (45 μL, 0.30 mmol) and DMAP (14 mg, 0.12 mmol) were added. The reaction mixture was kept under constant stirring at room temperature for 24 hours. The separated organic phase was then washed with saturated solutions of NH₄Cl and NaHCO₃, (3×30 mL) and dried over anhydrous Na₂SO₄. The solution was filtered and the solvent removed by rotary evaporator until a yellow oil was obtained, purified on chromatographic column with the eluent Et.Pet:EtOAc/7:3 to obtain the product of the title of formula (V) (41 mg, yield 41%) in the form of a light yellow oil. The product was characterized as follows by NMR and IR spectroscopy.

$^1$H NMR, 400 MHz, CDCl₃, δ: 1.19-1.42 (m, 16H, 6CH$_{2alkyl}$+CH₂-8+CH₂-18+CH₂-18*); 1.62-1.76 (m, 4H, 2CH$_{2alkyl}$); 1.88-1.94 (m, 2H, CH₂-16); 2.12-2.15 (t, 2H, J=5.4, CH₂, C-41); 2.28-2.32 (m, 2H, CH₂-17); 2.55-2.59 (t, 2H, J=5.4, CH₂, C-32); 2.65-2.81 (m 3H, CH₂-7+CH₂-7*); 3.20-3.47 (m, 5H, CH₂-9+CH₂-15, H-9*); 4.07-4.09 (m, 1H

H-13*); 4.61-4.64 (m, 1H, H-15*); 5.16-5.19 (m, 1H, H-13); 6.05 (bs, 1H, NH-10); 6.70 (bs, 1H, NH*); 7.19-7.21 (m, δH, $H_{arom}$); 7.25, 7.29 (m, 10H, $H_{arom}$); 7.40-7.42 (m, δH, $H_{arom}$); 7.90-8.02 (m, 2H, CH-24+CH-28). The spectrum $^1$H-NMR shows the presence of a rotamer mixture 1:0.72. For the signals where the attribution to the different rotamers has been possible, the symbol (*) refers to the minority rotamer.

$^{13}$C NMR, 100 MHz, CDCl$_3$, δ: 20.41; 20.68; 24.76; 25.25; 25.74; 26.00; 28.50; 20.90; 29.02; 20.12; 29.30; 31.27; 33.0133.19; 34.37; 39.42; 44.57; 51.83; 57.02; 122.40; 127.47:127.76; 128.40; 129.50; 131.33; 145.07; 155.95; 156.25; 167.31; 168.20; 169.36 (amide C=O); 171.40; 190.22; 191.10 (ketone C=O).

IR (CDCl$_3$):2931 (CH stretch.), 1711 (C=O stretch.), 1601 (Ph-C=O stretch.).

$[\alpha]^{25}_D$=−3.45 (c=44 mg in 2 mL DCM)

Step 5: Preparation of (S)-4-(2-oxo-2-(2-((3-phenylpropyl)carbamoyl)piperidin-1-yl)acetyl)phenyl 11-mercaptoundecanoate of Formula (VI)—GPS-SH1

(VI)

TFA (10 μL, 0.14 mmoles) and Et$_3$SiH (14 μL, 0.089 mmoles) were added dropwise to a solution of (S)-4-(2-oxo-2-(2-((3-phenylpropyl)carbamoyl)piperidin-1-yl)acetyl) phenyl-11-(tritylthio)undecanoate (15 mg, 0.018 mmol) in anhydrous DMF (10 mL). The reaction mixture was then left under constant stirring for 45 minutes at room temperature. Then the solvent was removed by rotary evaporator and the reaction raw purified by column chromatography with eluent Et.Pet.:EtOAc/6:4) to obtain the product GPS-SH1 of the title of formula (VI) (7.0 mg, yield 70%) in the form of a light yellow oil. This product was characterized by NMR, IR and mass spectroscopy, obtaining the following data:

$^1$H NMR, 400 MHz, CDCl3, δ: 1.25-1.42 (m, 16H, $6CH_{2akyl}$+CH$_2$-8+CH$_2$-18+CH$_2$-18*); 1.57-1.76 (m, 4H, $2CH_{2akyl}$); 1.90-1.94 (m, 2H, CH$_2$-16); 2.25-2.35 (m, 2H, CH$_2$-17); 2.40-2.55 (q, J=6, J=6.4, 2H, CH$_2$, CH-41); 2.56-2.58 (t, J=8, 2H, CH$_2$, CH$_2$— 32); 2.65-2.75 (m 3H, CH$_2$-7+CH$_2$-7*); 3.20-3.49 (m, 5H, CH$_2$-9+CH$_2$-15, H-9*); 4.07-4.09 (m, 1H, H-13*); 4.60-4.64 (m, 1H, H-15*); 5.16-5.19 (m, 1H, H-13); 6.05 (bs, 1H, NH-10); 6.70 (bs, 1H, NH*); 7.19-7.23 (m, 3H, $H_{arom}$); 7.25-7.30 (m, 4H, $H_{arom}$); 7.90-8.02 (m, 2H, CH-24+CH-28). The spectrum $^1$H-NMR shows the presence of a mixture of two rotamers 1:0.70. For the signals where the attribution to the different rotamers has been possible, the symbol (*) refers to the minority rotamer.

$^{13}$C NMR, 100 MHz, CDCl$_3$, δ: 20.41; 20.68; 24.76; 25.25; 25.74; 26.00; 28.50; 20.90; 29.02; 20.12; 29.30; 31.27; 33.0133.19; 34.37; 39.42; 44.57; 51.83; 57.02; 122.40; 127.76; 145.07; 155.95; 156.25; 167.31; 168.20; 169.36 (amide C=O); 171.40; 190.22; 191.10 (ketone C=O).

IR (CDCl$_3$):2922 (CH stretch.), 1729 (C=O stretch.), 1601 (Ph-C=O stretch.), 1522 (C=C stretch).

Exact mass for C$_{34}$H$_{46}$N$_2$O$_5$S. Calculated 595.3161; Found 594.3164.

$[\alpha]^{25}_D$=−3.18 (c=6 mg in 2 mL DCM).

Example 2

Preparation of the Self-Assembled Monolayer (Here Also Referred to as SAM, from Self-Assembled Monolayer)

The functionalised GPS-SH1 receptor prepared as described above in Example 1 was solubilized in ethanol forming a 1 mM solution, which was used to coat a gold-coated piezoelectric quartz crystal.

The C12-SH, C18-SH and PEG-SH spacers, having the above reported formulas, were used together with the functionalised GPS-SH1 receptor, to prepare mixed solutions in ethanol with various receptor-spacer molar ratios in the interval between 1:3 and 1:10. These mixed solutions have also been used to coat gold substrates of the type indicated above.

After contact by immersion for about 4 hours of time, the substrates were rinsed with abundant water and ethanol, then dried with compressed air or N$_2$.

Figure 3:
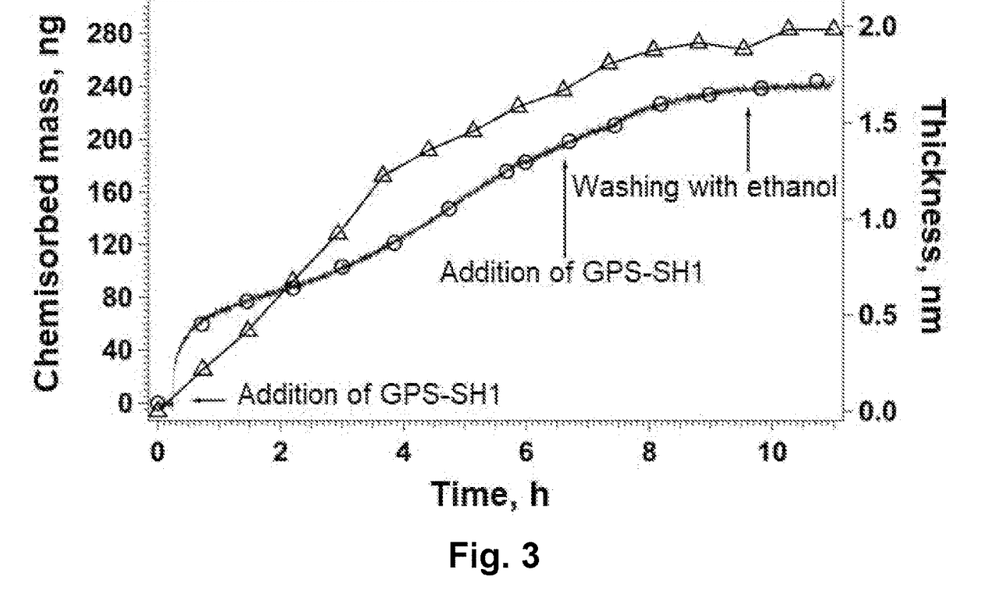
FIG. 3: trend of the formation of the sensor unit of the invention, monitored by QCM measurements of bound mass (left axis) and change in the thickness (right axis) of the monolayer.

A compact monolayer of receptor or receptor/spacer molecules was formed on the gold substrate by adding increasing concentrations of receptor or receptor/spacer respectively on the substrate. The formation of the monolayer over time was monitored with microgravimetric measurements by means of a quartz crystal microbalance (QCM) with dissipation analysis instrumentation. With this instrumentation, the frequency variation of the crystal covered with gold was measured, which is proportional to the quantity of mass adsorbed on the surface, and conveys the thickness thereof. FIG. 3 shows the formation kinetics of the compact self-assembled layer obtained with the functionalised GPS-SH1 receptor of Example 1. In FIG. 3 the continuous curve represents the thickness of the GPS-SH1 monolayer, while the dashed curve represents the GPS-SH1 mass bound on the gold surface.

Once reached the saturation of the surface, completely covered by the molecules of the receptor or of the receptor/spacer mixture, i.e. when no change in frequency is observed, the rinsing and drying process was carried out as described above to eliminate any residual unbound material.

The following Table 1 shows the structural parameters for the monolayer chemisorbed on the gold surface when formed by the GPS-SH1 receptor alone, or by the GPS-SH1 receptor inserted in a matrix of the two C12-SH and PEG-SH spacers in ratio receptor:spacer 1:6.

TABLE 1

Structural characteristics of the nanosensor

| SAM composition | Adsorbed mass density, ng/cm$^2$ | Average area available per molecule, Å$^2$ | Monolayer thickness, Å |
|---|---|---|---|
| GPS-SH1 | 264 | 39 | 20 |
| GPS-SH1/C12-SH 1:6 | 140 | 24$^a$ | 18 |
| GPS-SH1/PEG-SH 1:6 | 223 | 117$^a$ | 6 |

$^a$calculated using the average molecular weight for the 1:6 mixture.

Figure 4:
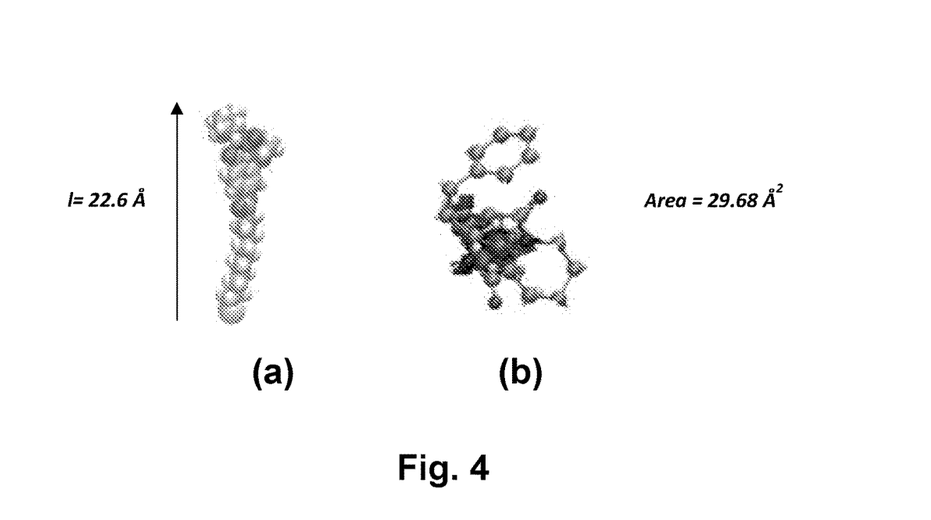
FIG. 4: illustration of the theoretical structure calculated for a GPS-SH1 molecule as described in the following Example 2, shown as a side view (4*a*) and as a top view (4*b*)

The optimal theoretical structure of a GPS-SH1 molecule in extended conformation was obtained from theoretical calculations providing a value of 26 Å for the length of the molecule at maximum extension, from the same calculations the cross section for the molecule of 29.8 Å$^2$ was estimated in the conformation shown in FIG. 4.

For the monolayer consisting of GPS-SH1 only on gold, the comparison between experimental measurements and theoretical calculations indicates that the receptor molecule assumes an extended conformation with the thiol group (—SH) anchored to the surface and a tilt angle of 13° with respect to the normal to the surface; this indicates that the molecules are compacted in an almost vertical conformation in the nanostructure with an average experimental area of 40 Å$^2$.

As reported above in Table 1, in the case of mixed SAM GPS-SH1 and C12SH, the average thickness of the monolayer remains almost unchanged while the average area available for each molecule decreases to 24 Å$^2$. In the case of mixed GPS-SH1 and PEG-SH platforms the measurements resulted in an average thickness of 6 Å, much lower than that of GPS-SH1 alone, indicating that the group available for protein binding extends beyond out of the surface of the SAM towards the solution, while in the case of the C18-SH spacer, on the other hand, stable SAMs with compact covering, suitable for the construction of the sensor platform of the invention, were not obtained.

Example 3

Detection of FKBP12 with the Self-Assembled Monolayer of Example 2

The gold-coated piezoelectric quartz support covered with the SAMs as described above in Example 2, was brought into contact with solutions of increasing concentration of the FKBP12 protein and the concentration of the protein bound to the self-assembled monolayer SAM at saturation was recorded with gravimetric measurements.

Two different miniaturized versions of an open chamber QCM quartz crystal microbalance (from QCM KSV, Finland and an OpenQCM, Italy modified by the inventors) were also used as a device, allowing the use of small measurement volumes (less than 100 microliters) of the solution to analyse. In this case, in addition to being able to use samples with low volume availability (biological fluids, cerobrospinal fluid, CSF, etc.), it was also possible to significantly shorten the response times that might be significantly high in standard instrumentation for very low concentrations of FKBP12 due to of the diffusion process of the protein from the solution to the surface.

Figure 5:
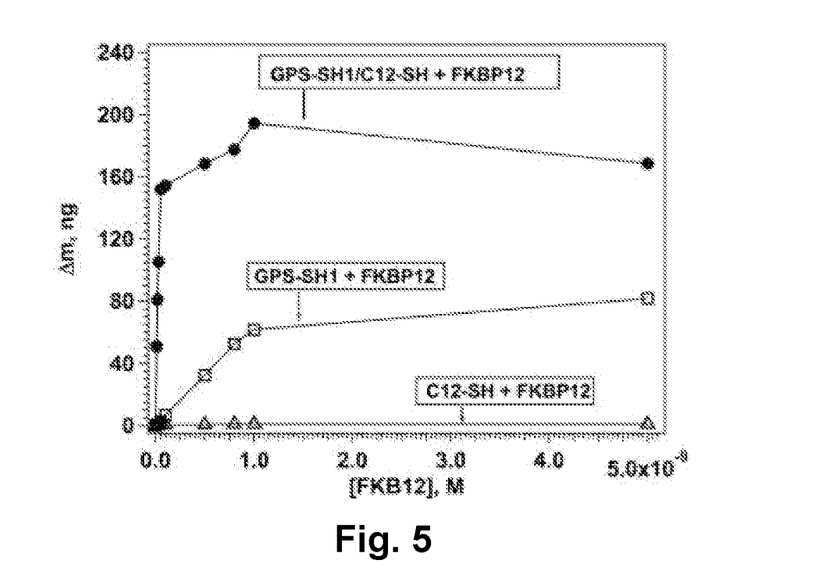
FIG. 5: trend of the mass of FKBP12 bound to the sensor as a function of the concentration of FKBP12 in solution for various sensor units of the invention, as described in detail in the following Example 3.

FIG. 5 shows the results obtained for the SAM of only the GPS-SH1 receptor and for the SAM with the same receptor and the CH12SH spacer in proportion receptor:spacer=1:6. Also the results obtained with a SAM consisting of a CH12SH spacer only, without the receptor, are reported in FIG. 5 as a comparison example. The curves shown in FIG. 5 represent the trend of the FKBP12 mass bound to SAM as a function of the concentration of FKBP12 in solution; from these data it is evident how the FKBP protein binds both to the substrate comprising GPS-SH1 and to the substrate comprising the mixed nanosensor GPS-SH1/C12SH in a molar ratio 1:6. The comparison datum with the SAM consisting of a C12SH spacer only, without receptor, for which no interaction with the FKBP protein in solution is observed, is interesting, as well.

Again with reference to FIG. 5, it can be observed that in all the examined cases there is a saturation trend of the curves, which flatten once the sites available for binding the FKBP protein are exhausted. Considering the structure reached at this concentration as the final equilibrium structure, the relative structural parameters reported in the following Table 2 were calculated.

TABLE 2

Structural characterization of nanosensor + FKPP12 Langmuir model

| | | Langmuir FIT | |
|---|---|---|---|
| SAM composition | Kd$^a$, pM | (M/Area)$_{max}$, ng/cm$^2$ | |
| GPS-SH1 | 750 | 123 | |
| GPS-SH1/C12-SH 1:6 + FKBP12 | 25 | 250 | |
| GPS-SH1/PEG-SH 1:6 + FKBP12 | 112 | 223 | |

The trend shown in FIG. 5 can be rationalized through the Langmuir binding and/or adsorption equation:

$$\Delta m/A = (\Delta m/A)_{sat}[C]/[C] + k_d$$

Figure 6:
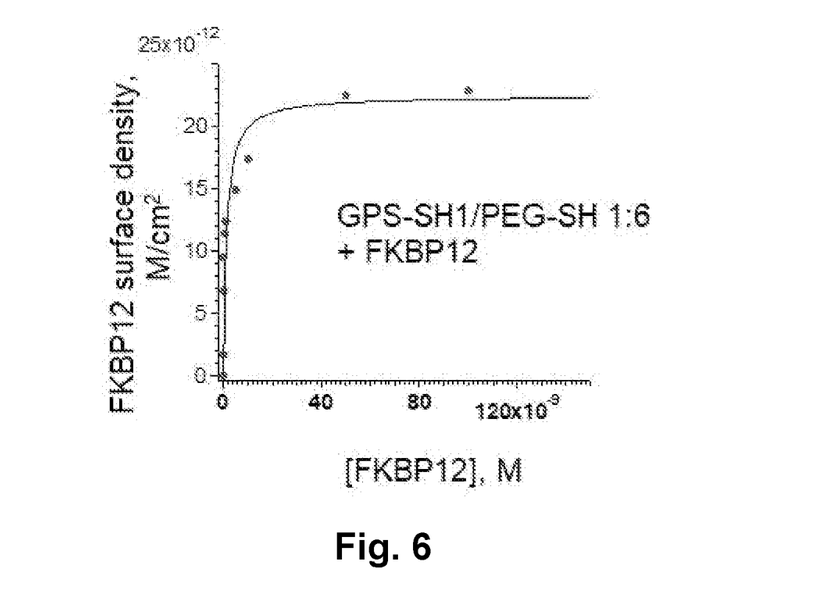
FIG. 6: illustration of an example of fitting of the experimental data with the Langmuir model applied to the DPSH-SH1/PEG-SH 1:6+FKBP12 system, as described in Example 3 below.

FIG. 6 shows an example of fitting of the experimental data with the Langmuir model for the GPS-SH1/PEG-SH system in the ratio 1:6+FKBP12.

The application of this model to the data obtained from the microgravimetric measurements allowed to obtain a detailed picture of the interaction mechanism and the energetics involved, in particular we obtained the maximum surface density of FKBP12 (to saturation), the dissociation constant Kd for FKBP12/receptor in the nanosensor and free energy of physi-sorption. The values obtained are shown in Table 3 below, for all the types of SAMs examined.

TABLE 3

Structural characterization of nanosensor + FKPP12

| | Experimental data | | Langmuir FIT | |
|---|---|---|---|---|
| | Area available | Ratio Area | | |
| SAM composition | for FKBP12 to saturation, Å$^2$ | FKBP12/Area GPS-SH1$^b$ | Kd$^a$, pM | (Maa/Area)$_{max}$, ng/cm$^2$ |
| GPS-SH1 | 1910 | 56:1 | 750 | 123 |
| GPS-SH1/C12-SH 1:6 + FKBP12 | 881 | 8:1 | 25 | 250 |

TABLE 3-continued

Structural characterization of nanosensor + FKPP12

| | Experimental data | | | |
|---|---|---|---|---|
| | Area available | Ratio Area | Langmuir FIT | |
| SAM composition | for FKBP12 to saturation, Å$^2$ | FKBP12/Area GPS-SH1$^b$ | Kd$^a$, pM | (Maa/Area)$_{max}$, ng/cm$^2$ |
| GPS-SH1/PEG-SH 1:6 + FKBP12 | 730 | 6:1 | 112 | 223 |

$^a$In the case of mixed pseudo-Kd systems.
$^b$in the case of mixed systems the area for each receptor molecule was considered equal to the average area.

Example 4

Construction of the Calibration Straight Line for FKBP12

Figure 7:
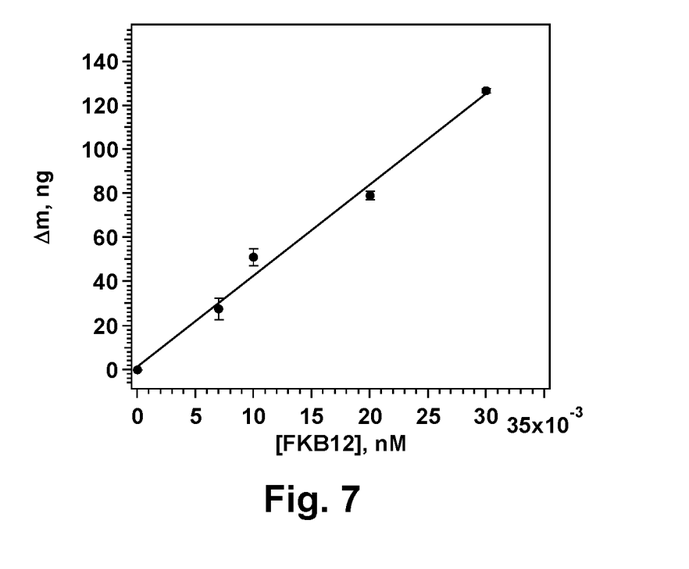
FIG. 7: calibration curve for FKBP12, obtained using a sensor unit of the present invention, composed of GPS-SH1/C12SH 1:6.

The data reported in FIG. 5 discussed above also showed the existence of a linearity interval between the mass of the protein detected on the SAM and the initial concentration of FKBP12 in solution. A typical example of a calibration curve for the nanostructure formed by SAM GPS-SH1/C12-SH 1:6 is reported in FIG. 7.

From the analysis of the calibration straight lines obtained for the systems examined, the linearity intervals and the experimental limit of detection (LOD) were obtained (wherein LOD means the smallest amount of measurable analyte with acceptable accuracy and precision) for each sensor tested, considering that the maximum sensitivity to the mass in the cell for liquids of the instrumentation used is 0.5 ng/cm$^2$. This limit may vary depending on the analytical instrumentation adopted for the same SAM used. The results obtained are summarized in the following Table 4.

TABLE 4

Characteristics of the response of the GPS-SH1 nanosensor/spacer to the FKBP12 protein

| Nano-sensor | Linear interval/pM | Limit of Detection (LOD)$^a$ pM | R$^2$ |
|---|---|---|---|
| GPS-SH1 | 10-800 | 8.0 | 0.99983 |
| GPS-SH1/C12-SH 1:6 | 10-50 | 8.7 | 0.98842 |
| GPS-SH1/PEG-SH 1:6 | 10-100 | 8.2 | 0.99043 |

$^a$calculated as LOD = 3x (y-intercept standard deviation)/slope of the calibration curve.

Example 5

Duration of Operation of the SAM and the Reconditioning Thereof

The microgravimetric measurements described above were repeated on freshly prepared SAMs or aged up to 4 months, finding the same results, at least for SAMs stored in closed containers saturated with N$_2$.

Measurements were also carried out on SAMs already used for a measurement, after reconditioning with imidazole or with ethanol. In both cases, the frequency measurement of the GPS-SH1-covered QCM support prior to the addition of FKBP12 and after rinsing with the reconditioning solvent turned out to be identical, demonstrating the detachment and/or the denaturation of the protein by adding the solvent. The same result was achieved by leaving in incubation the SAM in solution of the reconditioning solvent.

Therefore, the SAM of the invention is not a disposable device, but it can be reused for subsequent uses if reconditioned after the first measurement, with a solvent suitable for detaching any protein bound in the first measurement.

The present invention has been described herein with reference to a preferred embodiment. It is to be understood that there may be other embodiments that relate to the same inventive nucleus, all falling within the scope of protection of the claims provided below.

BIBLIOGRAPHICAL REFERENCES

[1] R. A. Hauser, Nature Partner Journal: Parkinson's Disease, 2018, 29;
[2] S. Chattopadhaya et al, Models and Treatments, Interch, 2012;
[3] H. Sugata et al., Neuroscience Letters, 2009, 459, 96-99T;
[4] M. Gerard, The Journal of Neuroscience, 2010, 30, 2454-2463; G. Caminati et al., Journal of enzyme inhibition and medicinal chemistry 2019, 34 (1), 1711-1715;
[5] M. Avramut et al., Physiology and Behavior, 2002 vol: 77 (4-5) pp: 463-468;
[6] A. Nilsson et al., Journal of Proteome Research, 2007, 6, 3952-3961;
[7] Y. Honjo et al., Brain Res 2018; 1680:39-45.
[8] K Tarumi et al., Immunopharmacol. Immunotoxicol., 20 (1998), p. 211
[9] J. Solassol et al., Current Opinion in Pharmacology, 2011, 11, 320-325;
[10] N. Shinkura et al., Autoimmune Diseases Autoimmunity, 1999, 29, 159-170
[11] M. Menotta et al., Analytica Chimica Acta, 2015, 884, 90-96;
[12] Y. Takakusagi et al., Bioorganic & Medicinal Chemistry, 2008, 16, 9837-9846;
[13] M. R. Martina et al., MATEC Web of Conferences 4, 02002 (2013)

The invention claimed is:
1. A compound of formula (I)

(I)

wherein
L is selected from the group consisting of thiol, organosulfur group, carboxylic acid, primary amine, trichlorosilane, trimethoxysilane, triethoxysilane, cholesterol, benzene, naphthalene, anthracene, phenanthrene, and pyrene, Y is selected from —(CH$_2$)$_n$— and —(OCH$_2$CH$_2$)$_m$—, where n is between 7 and 13 and m is between 2 and 6.
2. The compound of claim 1, wherein n is 8.
3. The compound of claim 1, wherein L is a thiol group.

4. A process for preparing a compound of formula (I) of claim 1, comprising the steps of:

a) preparing an (S)-carbamoyl piperidine of formula (II) starting from 3-phenylpropyl-1-amine b) preparing an (S)-piperidin-2-carboxy-amide of formula (IV)

by reacting said (S)-carbamoyl piperidine of formula (II) prepared in step a) with 4-hydroxyphenylglyoxalic acid; and c) synthesizing a spacing agent for the covalent bonding of a Y—CH$_2$-L group to (S)-piperidin-2-carboxy-amide of formula (IV) obtained above in step b).

5. A sensor unit for detecting devices of the FKBP12 protein in biological samples, comprising a substrate having a measurement surface on at least a part of which there is a monolayer coating of a compound of formula (I) of claim 1.

6. The sensor unit of claim 5, wherein said coating has nanometric thickness.

7. The sensor unit of claim 5, wherein said measurement surface is a metal surface or a surface coated with a metallic coating.

8. A process for preparing the sensor unit of claim 5, comprising immersing at least part of the measurement surface of the unit in a solution of a compound of formula (I)

wherein

L is selected from the group consisting of thiol organo-sulfur group, carboxylic acid, primary amine, trichlorosilane, trimethoxysilane, triethoxysilane, cholesterol, benzene, naphthalene, anthracene, phenanthrene, and pyrene, Y is selected from —(CH$_2$)$_n$— and —(OCH$_2$CH$_2$)$_m$—, where n is between 7 and 13 and m is between 2 and 6, in a solvent selected from water, an organic solvent, and mixtures thereof, until the surface to be coated of said sensor unit is saturated, followed by rinsing in the same above said solvent.

9. A device for detecting the FKBP12 protein in biological samples, comprising as a sensor element the sensor unit as defined in claim 5 and a detection system of said FKBP12 protein.

10. The device of claim 9, for the detection of the FKBP12 protein down to subnanomolar concentrations.

11. The device of claim 9, wherein said FKBP12 protein detection system is selected from quartz crystal microbalance (QCM), Surface Plasmon Resonance device (SPR), instrumentation for electrochemical measurements, Surface Enhanced Raman Spectroscopy (SERS), instrumentation for fluorescence measurements, and combinations thereof.

12. The device of claim 9, wherein said FKBP12 protein detection system is miniaturized and/or combined with a microfluidic system for Lab-on-chip applications and multiple analyses.

13. The compound of claim 1, wherein the organo-sulfur group is selected from the group consisting of sulfide (—SR), disulfide (—SSR), thiolesters (—S C(O)R), and dithiocarbammates (—SC(S)NRR') wherein R and R', equal or different between each other, are alkyl or aryl residues, carboxylic acid, primary amine, trichlorosilane, trimethoxysilane, triethoxysilane, cholesterol, benzene, naphthalene, anthracene, phenanthrene, and pyrene.

14. The sensor unit of claim 5, wherein the monolayer coating is immersed in a matrix of a spacer molecule of formula CH$_3$—Z—CH$_2$-L, wherein Z is equal to Y with Y being selected from —(CH$_2$)$_n$— and —(OCH$_2$CH$_2$)$_m$—, where n is between 7 and 13 and m is between 2 and 6 or is a group —[OCH$_2$CH$_2$]$_{n-1}$—CH$_2$CH$_2$-L wherein L is selected from the group consisting of thiol, organo-sulfur group, carboxylic acid, primary amine, trichlorosilane, trimethoxysilane, triethoxysilane, cholesterol, benzene, naphthalene, anthracene, phenanthrene, and pyrene, and n−1 ranging between 4 and 100, or in a matrix of a phospholipid spacer molecule.

15. The sensor unit of claim 14, wherein the phospholipid of the phospholipid spacer molecule is selected from the group consisting of dipalmitoyl-phosphatidylcholine, dipalmitoylphosphatidylserine, dipalmitoyl phosphatidylethan-olamine, dipalmitoylphosphatidic acid, dioleylphos-phatidylcholine, and palmitoyloleylphos-phatidylcholine.

16. The sensor unit of claim 14, wherein Y and Z are equal to each other in said compound of formula (I) and in said spacer, when present.

17. The sensor unit of claim 7, wherein the metal surface or a surface coated with a metallic coating is covered with graphene or graphene oxide.

18. A method for detecting the FKBP12 protein in biological samples, comprising contacting a biological sample taken from a subject with a device of claim 9.

19. The method of claim 18, further comprising comparing the concentration of FKBP12 protein in the sample to the concentration of FKBP12 protein in a healthy subject and diagnosing a condition of the subject associated with the difference in the concentration of FKBP12 protein in the sample compared to the concentration of FKBP12 in the healthy subject.

20. The method of claim 19, wherein the condition is selected from the group consisting of neurodegenerative diseases, a tumor pathology, autoimmune diseases or disorders and subjects who have undergone organ and/or tissue transplantation.

21. The process of claim 8, wherein the organo-sulfur group is selected from the group consisting of sulfide (—SR), disulfide (—SSR), thiolesters (—SC(O)R), and dithiocarbammates (—SC(S)NRR') wherein R and R', equal or different between each other, are alkyl or aryl residues.

* * * * *